(12) United States Patent
Urakawa

(10) Patent No.: US 8,405,849 B2
(45) Date of Patent: Mar. 26, 2013

(54) COMMUNICATION APPARATUS

(75) Inventor: Yutaka Urakawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1157 days.

(21) Appl. No.: 12/052,528

(22) Filed: Mar. 20, 2008

(65) Prior Publication Data

US 2008/0239408 A1    Oct. 2, 2008

(30) Foreign Application Priority Data

Mar. 30, 2007   (JP) ................ 2007-090022

(51) Int. Cl.
*G06F 3/12* (2006.01)
*G06K 15/00* (2006.01)

(52) U.S. Cl. ............ 358/1.15; 358/1.16; 358/1.13; 358/1.14

(58) Field of Classification Search .......... 358/1.13, 358/1.14, 1.15, 1.16, 1.17, 1.18, 1.1, 400, 358/401, 403, 404, 407, 442, 444, 468, 435, 358/437; 347/2, 3, 5, 14, 23; 399/1, 8, 9, 399/10, 12, 17, 38
See application file for complete search history.

(56) References Cited

U.S. PATENT DOCUMENTS

| | | | |
|---|---|---|---|
| 6,827,279 B2 | 12/2004 | Teraura | |
| 7,738,799 B2* | 6/2010 | Kikuchi | ............. 399/12 |
| 2005/0141004 A1 | 6/2005 | Kiwada | |
| 2006/0010302 A1* | 1/2006 | Yamamoto et al. | ......... 711/163 |
| 2006/0132816 A1 | 6/2006 | Yamamoto et al. | |
| 2006/0215228 A1* | 9/2006 | Inaba | ........... 358/3.28 |
| 2007/0003340 A1* | 1/2007 | Yoshino | ........... 399/366 |
| 2007/0011269 A1 | 1/2007 | Jeon et al. | |

FOREIGN PATENT DOCUMENTS

| | | |
|---|---|---|
| CN | 1773524 A | 5/2006 |
| CN | 1877605 A | 12/2006 |
| JP | H08-265552 A | 10/1996 |
| JP | 2002-337426 A | 11/2002 |
| JP | 2005-063039 A | 3/2005 |
| JP | 2005-197834 A | 7/2005 |
| JP | 2005-348027 A | 12/2005 |
| JP | 2006-116746 A | 5/2006 |
| JP | 2006-175647 A | 7/2006 |
| JP | 2006-306112 A | 11/2006 |
| JP | 2007-058418 A | 3/2007 |
| JP | 2008-003226 A | 1/2008 |

(Continued)

OTHER PUBLICATIONS

Japan Patent Office; Notification of Reason for Refusal in Japanese Patent Application No. 2007-090022 (counterpart to the above-captioned U.S. patent application) mailed Apr. 14, 2009.

(Continued)

*Primary Examiner* — Dov Popovici
(74) *Attorney, Agent, or Firm* — Baker Botts L.L.P.

(57) ABSTRACT

A communication apparatus is provided. The apparatus includes an image data receiving unit which receives image data; a related data receiving unit which receives related data which relates to the image data; a data writing unit which writes the related data received by the related data receiving unit to a first storage unit; and a setting unit which is configured to set a write prohibition setting which prohibits writing of the related data to the first storage unit.

21 Claims, 12 Drawing Sheets

FOREIGN PATENT DOCUMENTS

JP        2008-003227 A      1/2008

OTHER PUBLICATIONS

Japan Patent Office, Notification of Reasons for Refusal in counterpart Patent Application No. JP 2007-090022, mailed Jun. 30, 2009.

The State Intellectual Property Office of the People'S Republic of China, Notification of First Office Action for Chinese Patent Application No. 200810087112.X (counterpart to above-captioned patent application), issued Feb. 12, 2010.

The State Intellectual Property Office of the People'S Republic of China, Notification of the Second Office Action for Chinese Patent Application No. 200810087112.X (counterpart to above-captioned patent application), issued Mar. 31, 2011.

The State Intellectual Property Office of the People'S Republic of China; Notification of The Third Office Action, for Application No. 200810087112.X, dated Dec. 16, 2011. [counterpart to above-captioned U.S. patent application].

* cited by examiner

FIG. 3

| NAME | TELEPHONE NO. | FACSIMILE NO. | WIRELESS TAG DATA RECEPTION SETTING |
|---|---|---|---|
| AAA | XXXXXXX | XXXXXXX | RECEPTION PERMISSION |
| BBB | YYYYYYY | YYYYYYY | RECEPTION PROHIBITION |
| CCC | ZZZZZZZ | ZZZZZZZ | RECEPTION PERMISSION |
| ⋮ | ⋮ | ⋮ | ⋮ |

COMMUNICATION APPARATUS

CROSS-REFERENCE TO RELATED APPLICATION

This application claims priority from Japanese Patent Application No. 2007-090022, filed on Mar. 30, 2007, the entire subject matter of which is incorporated herein by reference.

TECHNICAL FIELD

Apparatuses consistent with the present invention relate to communication apparatuses and, more particularly, to communication apparatuses capable of using wireless tags to manage data.

BACKGROUND

In recent years, a related art communications apparatus has been developed which uses a recording medium having a wireless tag incorporated therein as a storing means. Data can be written and read in a non-contact manner to and from the wireless tag, which is alternatively called an "IC tag" or a "radio frequency identification (RFID) tag."

For example, JP-A-8-265552 describes a related art multi-function communication terminal apparatus and a related art technique for using data that is stored in a wireless tag. The related art multi-function communication terminal apparatus reads destination information such as a telephone number or a facsimile number using a wireless tag reader from a wireless tag on a recording medium. The related art multi-function communication terminal apparatus then faxes image data recorded on the recording medium to a destination on the basis of the read destination information.

Therefore, the related art multi-function communication terminal apparatus described in JP-A-8-265552 makes it possible to fax to a desired destination merely by doing an act of causing the wireless tag reader to read wireless tag data stored in a wireless tag without a user on the transmission side having to perform the act of inputting destination information by himself or herself. As such, the multi-function communication terminal apparatus described in JP-A-8-265552 can increase the convenience of facsimile communication on the transmission side.

However, the related art multi-function communication terminal apparatus has a couple disadvantages. Although the related art multi-function communication terminal apparatus described in JP-A-8-265552 increases the convenience of facsimile communication, it only increases convenience on the transmission side. No consideration is given to the convenience of facsimile communication on the reception side, i.e., at the destination of the communication. That is, the related art multi-function communication terminal apparatus does not make use of a wireless tag and wireless tag in terms of increasing the convenience of facsimile communication on the reception side.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a communication apparatus which can receive image data and related data relating to the image data and write the received related data to a storing means and which, in particular, can increase the convenience of facsimile communication on a reception side.

According to an exemplary embodiment of the present invention, there is provided a communication apparatus comprising an image data receiving unit which receives image data; a related data receiving unit which receives related data which relates to the image data; a data writing unit which writes the related data received by the related data receiving unit to a first storage unit; and a setting unit which is configured to set a write prohibition setting which prohibits writing of the related data to the first storage unit.

According to another exemplary embodiment of the present invention, there is provided a communication apparatus comprising an image data receiving unit which receives image data; a related data receiving unit which receives related data which relates to the image data; a data writing unit which writes the related data received by the related data receiving unit to a first storage unit; a display unit; a display controller which controls the display unit; and a display setting unit which is configured to set a first detailed setting in which the display controller controls the display unit to display a content of the related data if the related data receiving unit receives the related data.

According to another exemplary embodiment of the present invention, there is provided a communication apparatus comprising an image data receiving unit which receives image data; a wireless tag data receiving unit which receives wireless tag data indicating information related to the image data, the information including identification information for identifying an external apparatus from which the image data is received by the image data receiving unit; a data writing unit which is configured to write the wireless tag data to a wireless tag provided on a recording sheet; and a setting unit which is configured to set a write prohibition flag which, if set, prohibits the data writing unit from writing the wireless tag data to the wireless tag provided on the recording sheet.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 3 illustrates storage contents of a telephone directory data storage area of the facsimile apparatus of FIG. 1;

DETAILED DESCRIPTION

Figure 1:
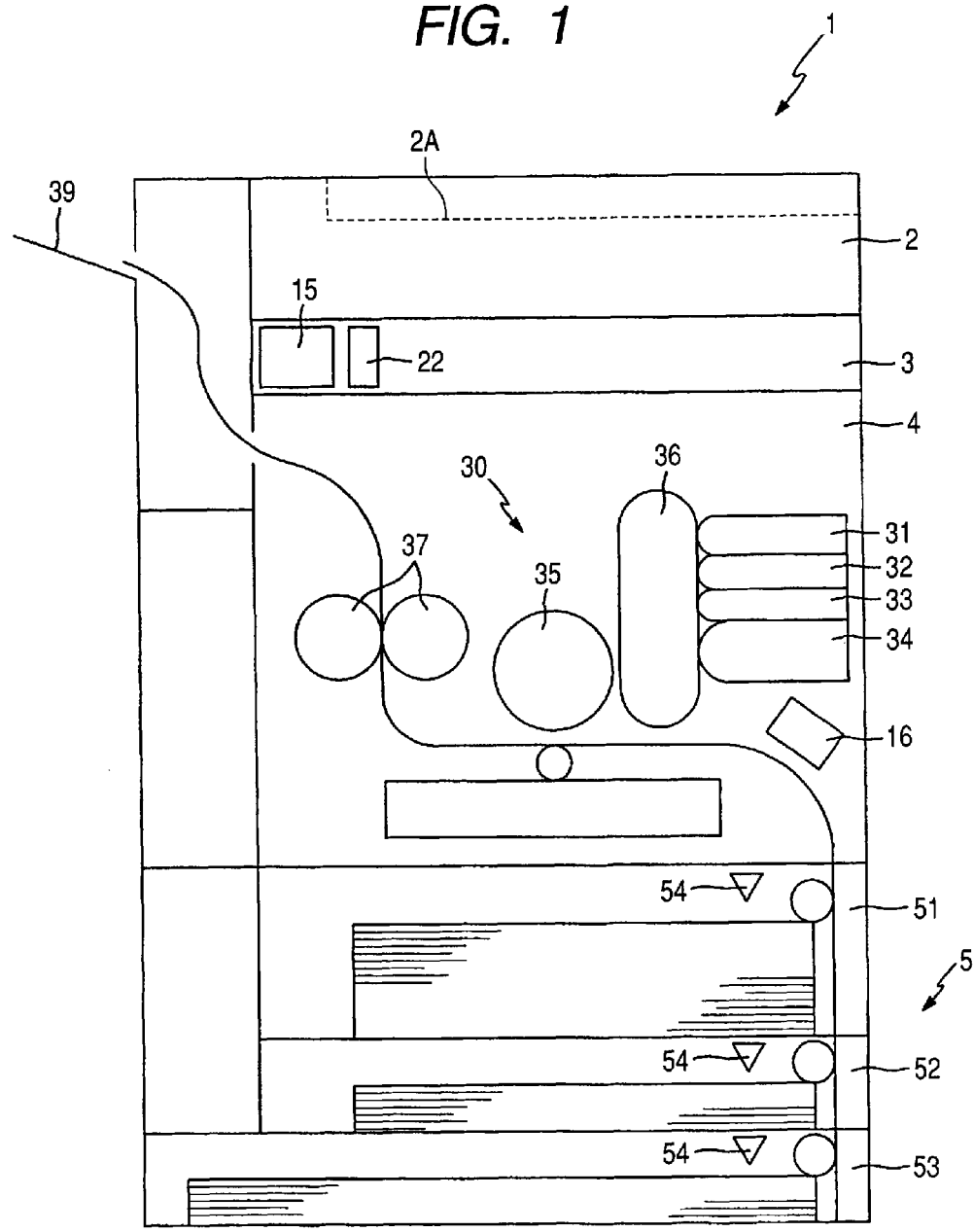
FIG. 1 is a schematic sectional view showing a configuration of a facsimile apparatus according to an exemplary embodiment of the present invention.

A communication apparatus according to an exemplary embodiment of the present invention will be hereinafter described in detail with reference to the drawings. The communication apparatus will be described with reference to an example of a facsimile apparatus. However, the present inventive concept is equally applicable to other communication apparatuses. FIG. 1 is a schematic sectional view showing the configuration of a facsimile apparatus according to the exemplary embodiment.

As shown in FIG. 1, a facsimile apparatus 1 has an automatic document feeder 2, a scanner unit 3, a printer unit 4, and a sheet supply tray unit 5.

The automatic document feeder 2 is equipped with a document placement unit 2A. A document to be transmitted is placed on the document placement unit 2A. When a start key (not shown) is depressed, the document is fed page by page and the scanner unit 3 reads it to produce image data. After the reading by the scanner unit 3, the document is ejected from a document ejection opening (not shown).

The scanner unit 3 is equipped with a wireless tag reader 15 and a scanner 22. If a wireless tag is attached to a document page that is sent from the automatic document feeder 2, the wireless tag reader 15 reads data from the wireless tag using a radio signal. The scanner 22 reads a document page sent from the automatic document feeder 2 to produce image data irrespective of whether or not the wireless tag is provided on the document. The wireless tag is an example of first storage unit according to the present invention.

The printer unit 4 comprises a wireless tag writer 16 and a laser printer 30. The wireless tag writer 16 writes, using a radio frequency signal, data (wireless tag data or the like (described later)) to a wireless tag that is attached to, included in, or otherwise provided with a recording sheet that is supplied from the sheet supply tray unit 5. For example, the wireless tag may be either stuck to or buried in the recording sheet.

The laser printer 30 is equipped with a Y station 31, an M station 32, a C station 33, and a K station 34. A yellow toner is provided in the Y station 31. Likewise, a magenta toner, a cyan toner, and a black toner are provided in the M station 32, the C station 33, and the K station 34, respectively. The laser printer 30 is also equipped with an intermediate transfer belt 36 for transferring toner of each of the above stations to a transfer drum 35 and fusing rollers 37. A recording sheet on which an image has been formed by the laser printer 30 is ejected to an ejected sheet stacker 39.

The sheet supply tray unit 5 is equipped with a first sheet supply tray 51, a second sheet supply tray 52, and a third sheet supply tray 53. Detection sensors 54 are disposed in the first sheet supply tray 51 to the third sheet supply tray 53, respectively. Each detection sensor 54 detects whether a wireless tag is present on a recording sheet and, if a wireless tag is determined to be present, also a write capacity of the wireless tag on each of the recording sheets housed in the corresponding one of the first sheet supply tray 51 to the third sheet supply tray 53. Each detection sensor 54 detects the write capacity of a wireless tag that is attached to each of the stacked recording sheets.

Figure 2:
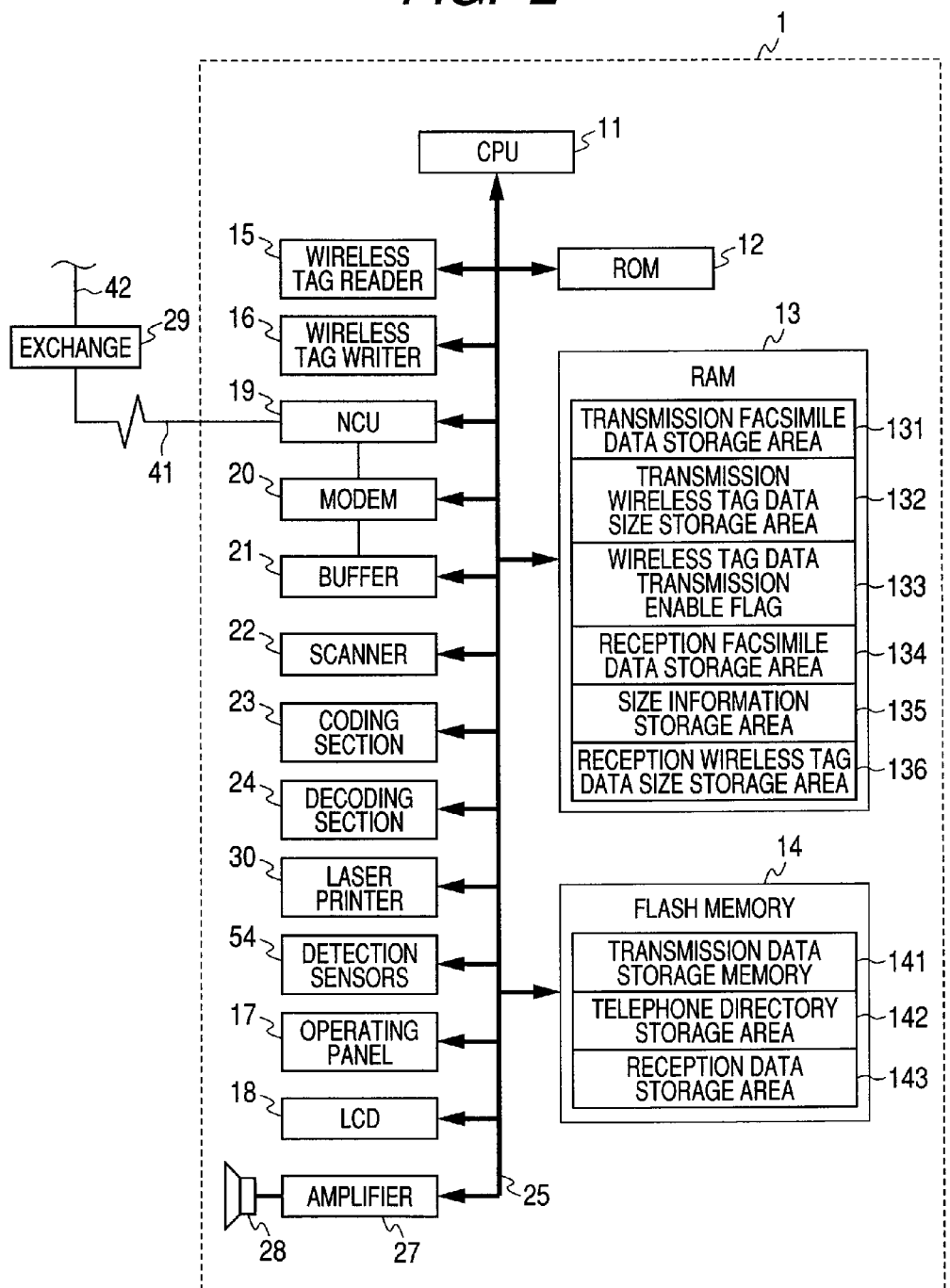
FIG. 2 is a block diagram showing the configuration of a control system of the facsimile apparatus of FIG. 1.

The configuration of a control system, according to an exemplary embodiment of the present invention, of the facsimile apparatus 1 will be described in detail with reference to drawings. FIG. 2 is a block diagram showing the configuration of the control system according to an exemplary embodiment of the present invention.

The facsimile apparatus 1 comprises the wireless tag reader 15, a wireless tag writer 16, a modem 20, a buffer 21, the scanner 22, a coding section 23, a decoding section 24, the laser printer 30, the detection sensors 54, an operating panel 17, a liquid crystal display (LCD) 18, a speaker 28, an amplifier 27, a central processing unit (CPU) 11, a read only memory (ROM) 12, a random access memory (RAM) 13, and a flash memory 14. These components and various peripheral devices such as a network control unit (NCU) 19 are coupled to each other via a bus line 25.

The CPU 11 of the facsimile apparatus 1 performs a facsimile operation, that is, a data communication, by controlling the individual components of the apparatus coupled to each other via the bus line 25 according to various signals that are exchanged via the NCU 19 which performs a line control. The ROM 12 is a non-rewritable memory in which control programs to be run in the facsimile apparatus 1 are stored. Various control programs such as a main control program (see FIG. 6), a facsimile receiving process program (see FIG. 8), and a reception data display process program (FIG. 10) (all described in more detail later) are stored in the ROM 12.

The RAM 13 is a memory for storing various data temporarily while the facsimile apparatus 1 performs individual operations. The RAM 13 is provided with a transmission facsimile data storage area 131, a transmission wireless tag data size storage area 132, a wireless tag data transmission enable flag 133, a reception facsimile data storage area 134, a size information storage area 135, and a reception wireless tag data size storage area 136.

The transmission facsimile data storage area 131 stores facsimile data 63 which comprises image data of a document read by the scanner 22 and wireless tag data read by the wireless tag reader 15. The structure of facsimile data 63 will be described later in detail with reference to a drawing. The wireless tag data is an example of related data according to the present invention.

The transmission wireless tag data size storage area 132 stores, on a page-by-page basis, data sizes of wireless tag data read by the wireless tag reader 15.

The wireless tag data transmission enable flag 133 indicates whether or not a facsimile transmission source apparatus 60 (see FIGS. 4A and 4B) has a function of writing data to a wireless tag. The reception facsimile data storage area 134 stores received facsimile data 63 temporarily.

The size information storage area 135 stores size information that is communicated from a transmission source facsimile apparatus 60. Size information that is communicated from a transmission source facsimile apparatus 60 comprises size information "0" indicating that facsimile data 63 does not include wireless tag data or size information "1" indicating the data size of wireless tag data included in facsimile data 63.

The reception wireless tag data size storage area 136 stores, on a page-by-page basis, data sizes of wireless tag data received from a transmission source facsimile apparatus 60 of facsimile data 63.

The flash memory 14 is a rewritable nonvolatile memory. A transmission data storage memory 141, a telephone directory data storage area 142, and a reception data storage area 143 are included in the flash memory 14. The transmission data storage memory 141 stores image data produced by the scanner 22 when a transmission of facsimile data to a facsimile transmission destination is prohibited.

The telephone directory data storage area 142 stores party-to-communicate-with identification data (e.g., telephone numbers, facsimile numbers, etc.) which enable identification of parties to communicate with (e.g., transmission source apparatus 60). In the telephone directory data storage area 142, the name of a party to communicate with and a wireless tag data reception setting are correlated with each other for each party-to-communicate-with identification data (see FIG. 3).

The wireless tag data reception setting is a setting as to what signal should be transmitted when an NSF signal is requested from a transmission source apparatus 60. As shown in FIG. 3, the wireless tag data reception setting is set to one of two settings, that is, a reception permission setting or a reception prohibition setting. In the facsimile apparatus 1, the wireless tag data reception setting can be made or changed for each party-to-communicate-with identification data by "other processes" (S5; described later). The details of a control based on each of the reception permission setting and the reception prohibition setting will be described later.

The reception data storage area 143 stores reception data sent from a transmission source apparatus 60 when a memory storage mode (described later) is set. The reception data storage area 143 is different from the reception facsimile data storage area 134 in that the storage contents of the former are held as a general rule whereas those of the latter can be erased automatically.

The modem 20 transmits or receives facsimile data 63 (see, e.g., FIG. 4B) by modulating or demodulating the facsimile data 63 and exchanging various procedure signals for transmission control. The buffer 21 temporarily stores data including coded facsimile data that is exchanged with a facsimile apparatus to communicate with.

The coding section 23 codes facsimile data 63 during transmission of the facsimile data 63. The decoding section 24 reads reception data stored in the buffer 21 and decodes the data.

The laser printer 30 prints image data as decoded by the decoding section 24 on recording sheets that are housed in one of the first sheet supply tray 51 to the third sheet supply tray 53.

The operating panel 17 comprises a plurality of numeral keys and other keys such as the above-mentioned start key. For each key of the operating panel 17, when the key is operated, an input signal is sent to the CPU 11 and a control based on the input signal is performed. For example, the operating panel 17 is used when various settings are made in the "other processes" (S6; described later) and a reception data display mode is selected in a reception data display process (S4; described later).

The LCD 18 displays various kinds of information and displays relating to the facsimile apparatus 1 that are performed under the control of the CPU 11. For example, a setting menu (see FIGS. 7A and 7B, for example) showing various setting items is displayed on the LCD 18 in making each of various settings and an image of reception data is displayed in the reception data display process (S4). The LCD 18 corresponds to display unit according to the present invention. The speaker 28 is coupled to the amplifier 17, and a call sound or the like is output from the speaker 28.

The facsimile apparatus 1 is coupled to an exchange 29 via the NCU 19 and a telephone line 41. The exchange 29 is coupled, via a telephone line 42, to a transmission-source-apparatus-side exchange, which is coupled to a transmission source apparatus via another telephone line. Therefore, the facsimile apparatus 1 can receive facsimile data 63 from the transmission source apparatus via the telephone line 41, the exchange 29, the telephone line 42, etc.

Figure 4A:
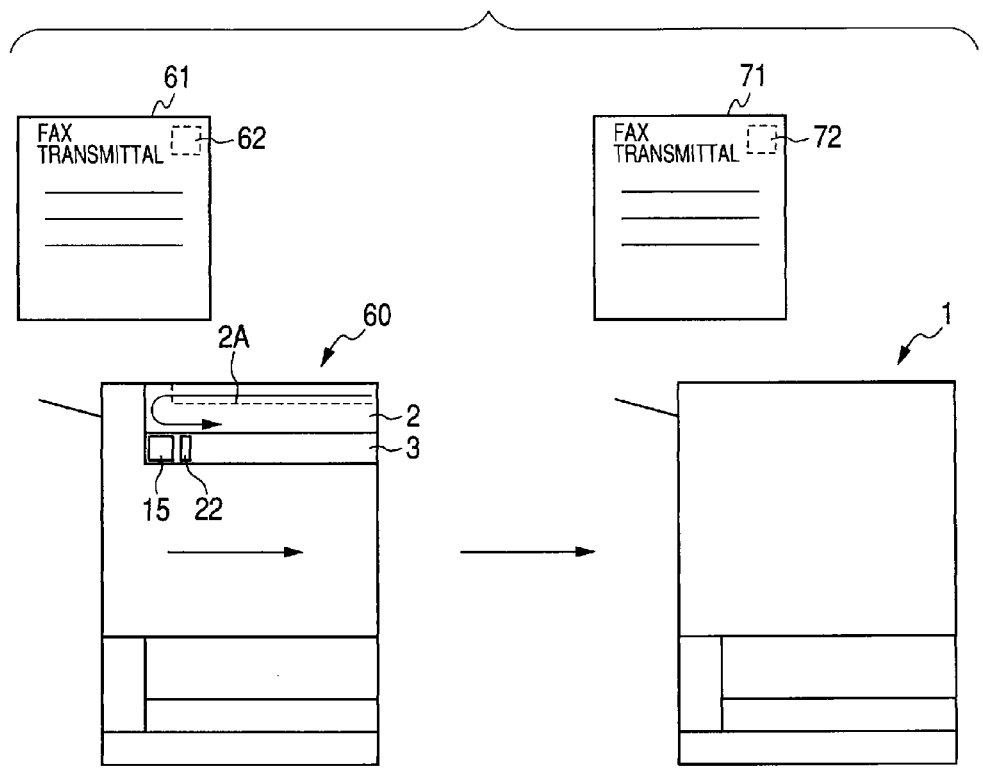
FIG. 4A schematically shows a facsimile transmission to the facsimile apparatus of FIG. 1, and FIG. 4B schematically shows facsimile data of one page.

The transmission and reception of facsimile data 63 by the facsimile apparatus 1 according to an exemplary embodiment will be outlined with reference to FIG. 4A which illustrates a facsimile transmission from a transmission source apparatus 60 to the facsimile apparatus 1.

The transmission source apparatus 60 shown in FIG. 4A has the same configuration as the above-described facsimile apparatus 1.

As shown in FIG. 4A, an image (including a figure and a text) is formed on each page of a document and a wireless tag 62 capable of storing wireless tag data is buried in each page of the document. Hereinafter, the document including the image and wireless tag 62 is referred to as "transmission document" 61 that a user on the transmission source apparatus 60 side (hereinafter referred to as "transmission source user") is going to facsimile-transmit.

When the transmission source user sets the transmission document 61 on the document placement unit 2A and operates the start key (not shown) of an operating panel 17 on the transmission source apparatus 60, the transmission document which is set on the document placement unit 2A is sent to a reading position of the scanner unit 3 on a page-by-page basis. A data reading position of the wireless tag reader 15 exists in a movement path of each page of the transmission document 61 which is moved relative to the scanner 22. Therefore, as each page of the transmission document 61 is moved by the automatic document feeder 2 and passes the reading position of the scanner 22, the wireless tag reader 15 reads the wireless tag data of the wireless tag 62 that is attached to the page of the transmission document 61.

As a result, in the transmission source apparatus 60, the wireless tag reader 15 can read the wireless tag data approximately at a same time the scanner 22 reads the image. That is, the user can cause the transmission source apparatus 60 to read the images and the wireless tag data merely by doing simple acts of placing the transmission document 61 on the document placement unit 2A and operating the start key. In the present invention, for example, "data relating to image data" may include wireless tag data read by the wireless tag reader 15 which corresponds to the image data produced by the scanner. Alternatively, it may be the original image data itself, or security data related to the image data, etc.

Herein, the wireless tag data which is an example of the related data may be, for example, identification data for identifying an apparatus, such as a telephone number or a facsimile number of the transmission source apparatus 60, original data of an image formed on a document to be read by the scanner 22, control information of the document for controlling a copy of the document and a printing of the document, security information of the document for indicating a security of the document, print setting information of the document, which indicates a setting when printing the document, or user information of the document and so on, which are related to the image data from the document.

An example of the structure of facsimile data 63 of one page of the transmission document 61 which has been read by the scanner 22 and the wireless tag reader 15 and is to be transmitted to the facsimile apparatus 1 will be described now in detail with reference to FIG. 4B which illustrates the data structure of facsimile data 63 of one page of the transmission document 61.

As described above, facsimile data 63 of one page comprises image data of one page of the transmission document 61 and wireless tag data read from the wireless tag 62 of that page. That is, the facsimile data 63 of one page is formed in such a manner that the image data produced by the scanner 22 and the wireless tag data read by the wireless tag reader 15 are correlated with each other.

When the thus-formed facsimile data 63 of one page is transmitted from the transmission source apparatus 60 to the facsimile apparatus 1, the facsimile apparatus 1 can form an image on a recording sheet 71 (see FIG. 4A) on the basis of the image data that is included in the facsimile data 63.

The facsimile apparatus 1 can also write the wireless tag data included in the facsimile data 63 to a wireless tag 72 that is attached to the recording sheet 71.

Figure 4B:
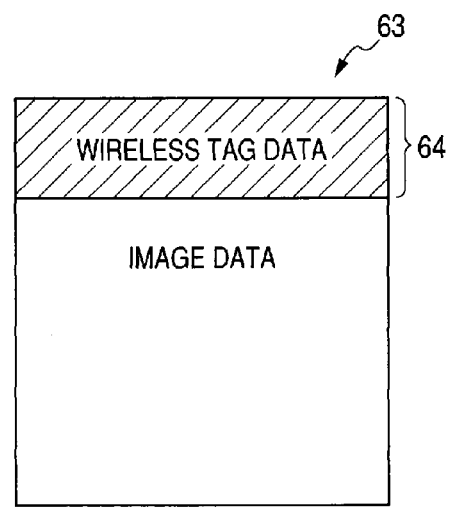

As shown in FIG. 4B, the facsimile data 63 of one page is formed so that the wireless tag data is transmitted before the image data. Therefore, if the size of the wireless tag data is determined, received data can easily be divided into the wireless tag data and the image data.

In transmitting the above-described facsimile data 63, first, the transmission source apparatus 60 transmits size information 64 relating to the size of the wireless tag data to the facsimile apparatus 1. As a result, the facsimile apparatus 1 can determine that a portion, starting from the head and having a prescribed size that corresponds to received size information 64, of reception data is the wireless tag data and hence can discriminate the wireless tag data from the image data reliably.

The configurations of the wireless tag, the wireless tag reader 15, and the wireless tag writer 16 according to an exemplary embodiment of the present invention will be described in detail with reference to FIG. 5A.

First, the configuration of the wireless tag (62 or 72) will be described in detail. The wireless tags 62 and 72 have a same configuration.

Figure 5A:
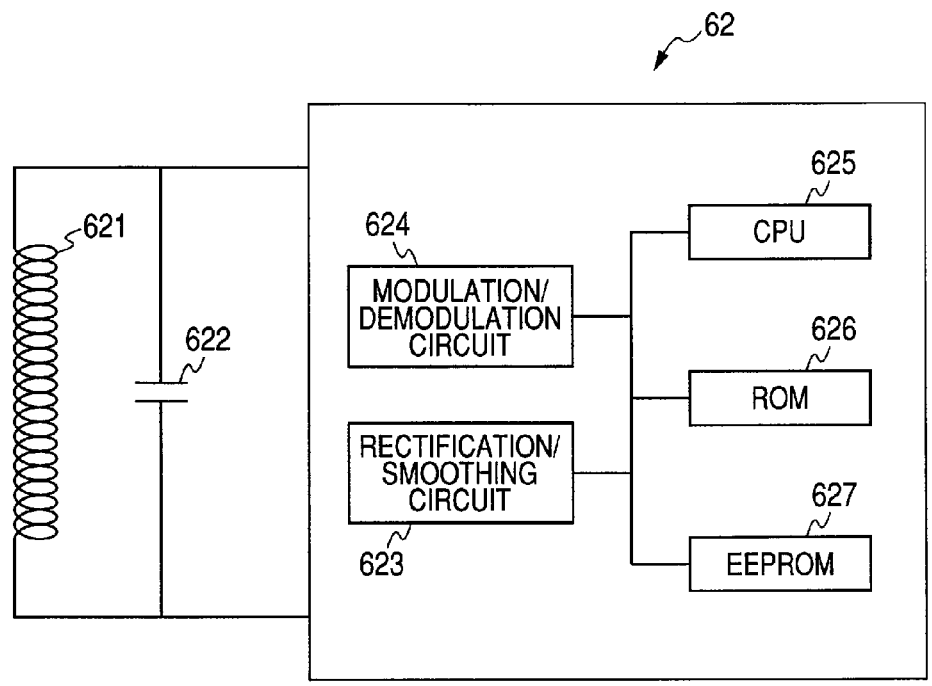
FIG. 5A is a block diagram showing the configuration of a wireless tag.

As shown in FIG. 5A, the wireless tag 62 comprises an antenna coil 621, a resonance capacitor 622, a rectification circuit 623, a modulation and demodulation circuit 624, a CPU 625, a ROM 626, and an electrically erasable and programmable read only memory (EEPROM) 627.

The antenna coil 621 and the resonance capacitor 622 are coupled in parallel to each other and form a resonance circuit. As such, the antenna 621 receives a power radio signal having a prescribed high frequency that is transmitted from the wireless tag reader 15 or the wireless tag writer 16 and supplies the power radio signal to the rectification circuit 623.

The rectification circuit 623, which serves as a power circuit, rectifies and smoothes a power radio signal sent from the resonance circuit and thereby supplies a constant DC voltage (DC power) to the CPU 625, etc.

A transmission signal from the wireless tag reader 15 or the wireless tag writer 16 is transmitted being superimposed on the power radio signal. The transmission signal is demodulated by the modulation and demodulation circuit 624 and supplied to the CPU 625.

Operating according to an operation program stored in the ROM 626, the CPU 625 performs processing according to a signal supplied from the modulation and demodulation circuit 624. That is, the CPU 625 performs write processing of writing received data to the EEPROM 627 as wireless tag data, read processing of reading wireless tag data from the EEPROM 627, modulating the wireless tag data with the modulation and demodulation circuit 624, and transmitting the wireless tag data as a radio signal with the antenna coil 621, and other processing.

In the wireless tag 62, the rectification circuit 623, the modulation and demodulation circuit 624, the CPU 625, the ROM 626, and the EEPROM 627 are provided on an integrated circuit (IC) chip. The IC chip is buried in a page of a transmission document 61 (see FIG. 4A) together with the antenna coil 621 and the resonance capacitor 622. The wireless tag 72, which has a same configuration as the wireless tag 62, is provided in a recording sheet 71.

The configurations of the wireless tag reader 15 and the wireless tag writer 16 according to an exemplary embodiment of the present invention will now be described in detail with reference to FIG. 5B.

Figure 5B:
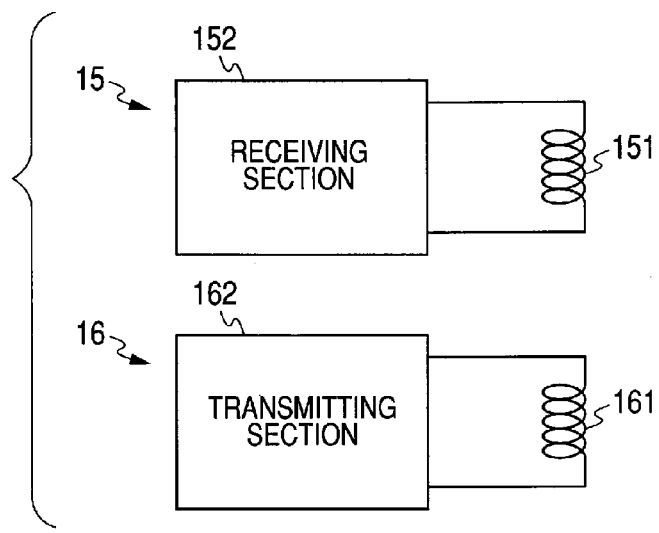
FIG. 5B shows block diagrams illustrating the configurations of a wireless tag reader and a wireless tag writer.

As shown in FIG. 5B, the wireless tag reader 15 comprises a reception antenna coil 151 and a receiving section 152. Therefore, the wireless tag reader 15 can receive a radio signal transmitted from the wireless tag 62 by means of the reception antenna coil 151. The wireless tag reader 15 demodulates, with the receiving section 152, the radio signal received by the reception antenna coil 151 and thereby recognizes radio signal as wireless tag data. In this manner, the wireless tag reader 15 can read the wireless tag data from the wireless tag 62.

On the other hand, the wireless tag writer 16 comprises a transmission antenna coil 161 and a transmitting section 162. Therefore, the wireless tag writer 16 can modulate a carrier signal with the transmitting section 162 and transmit a resulting power radio signal from the transmission antenna coil 161. Furthermore, the wireless tag writer 16 can modulate, with the transmitting section, wireless tag data to be transmitted so as to be superimposed on the power radio signal and transmit the modulated power radio signal from the transmission antenna coil 161. In this manner, the wireless tag writer 16 can write the wireless tag data to the wireless tag 72.

A main control program of the facsimile apparatus 1 according to an exemplary embodiment of the present invention will now be described in detail with reference to FIG. 6. Processing according to this main control program is performed repeatedly while the facsimile apparatus 1 is in operation.

Figure 6:
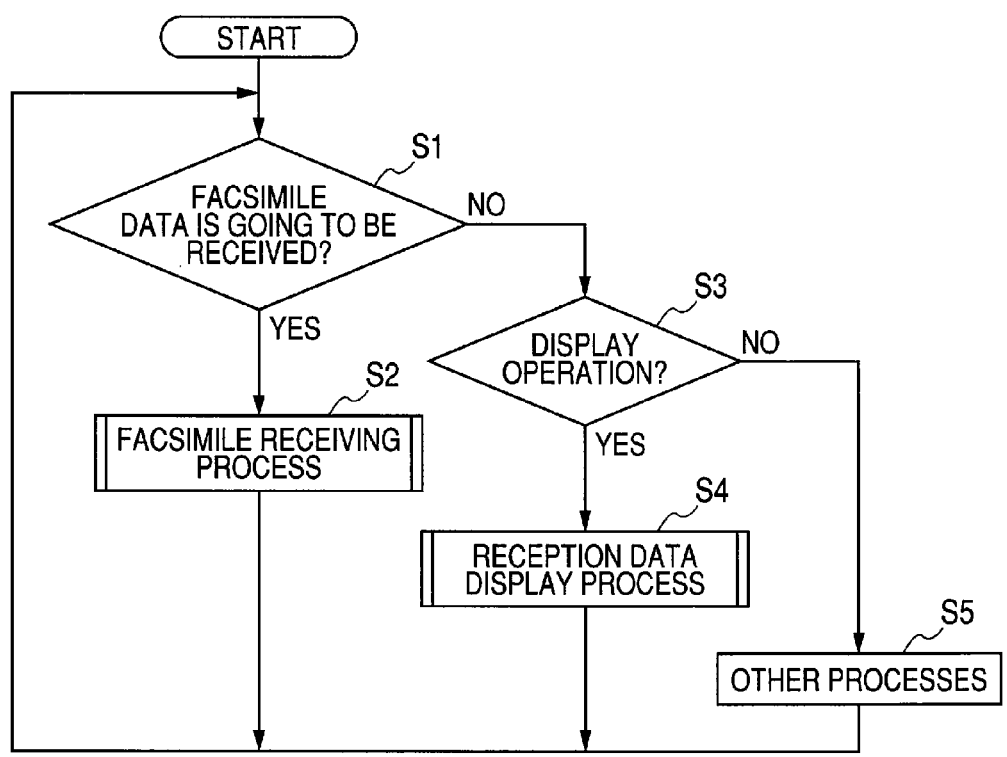
FIG. 6 is a flowchart of a main control program of the facsimile apparatus of FIG. 1.

As shown in FIG. 6, first, at operation S1, the CPU 11 determines whether facsimile data 63 is to be received. If it is determined that facsimile data 63 is to be received (S1: yes), the CPU 11 performs a facsimile receiving process (S2). On the other hand, if it is determined that facsimile data 63 is not to be received (S1: no), the CPU 11 performs a display operation (S3).

At operation S2, the CPU 11 runs a facsimile receiving process program. The details of the facsimile receiving process (S2) will be described later in detail with reference to FIG. 8.

At operation S3, the CPU 11 determines whether a display operation has been performed on the operating panel 17. Specifically, the CPU 11 makes the determination of operation S3 on the basis of an operation signal supplied form the operating panel 17. The display operation denotes an operation for displaying, on the LCD 18, the reception data stored in the reception data storage area 143. If it is determined that a display operation has been performed (S3: yes), the CPU 11 performs a reception data display process (S4). On the other hand, if it is determined that no display operation has been performed (S3: no), the CPU performs other processes (S5).

Figure 10:
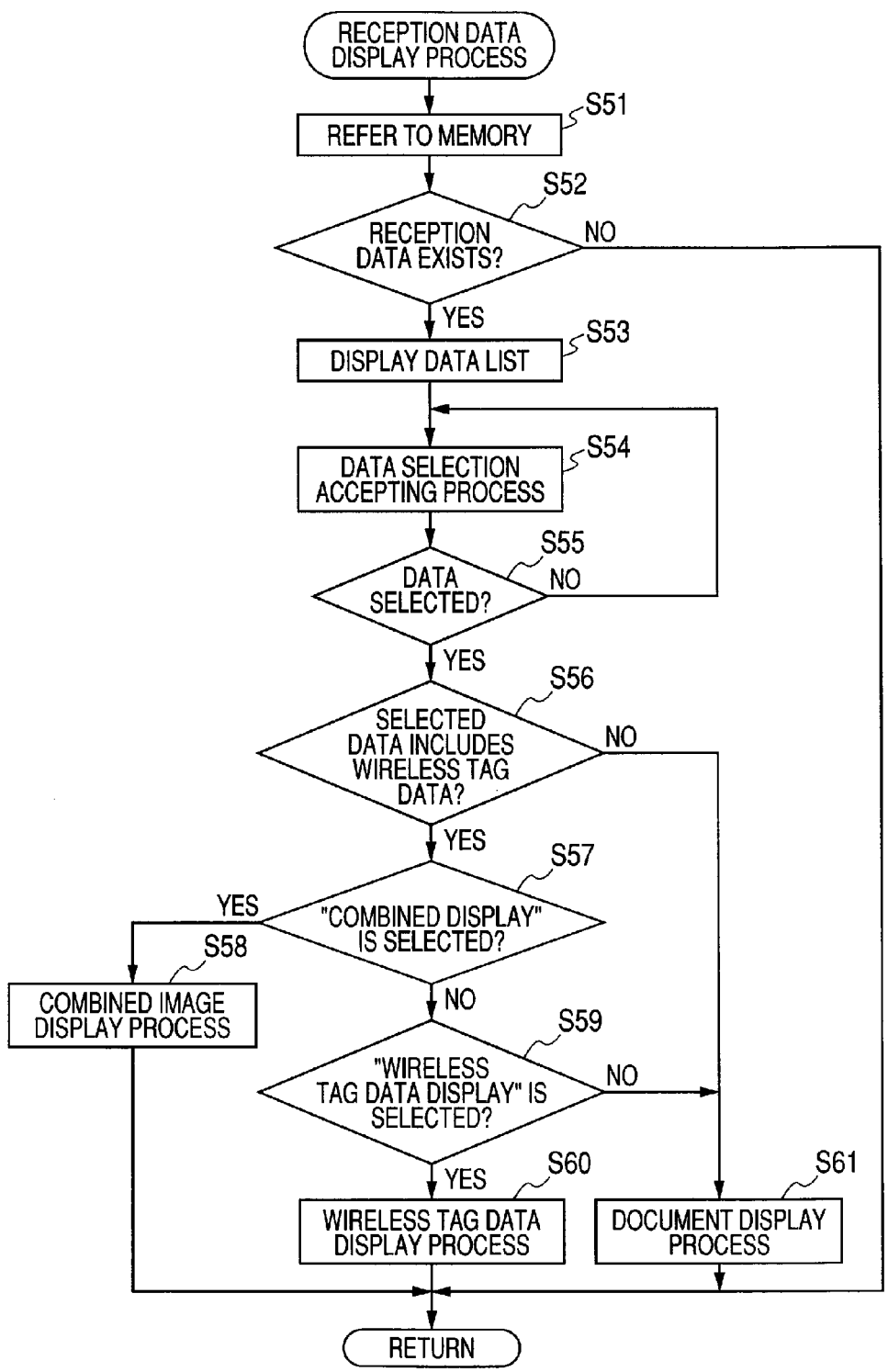
FIG. 10 is a flowchart of a reception data display process program according to an exemplary embodiment of the present invention.

At operation S4, the CPU 11 runs a reception data display process program, which will be described in detail later with reference to FIG. 10.

At operation S5, the CPU 11 performs processes that the facsimile apparatus 1 can perform excluding the above-described facsimile receiving process (S3) and the reception data display process (S4). For example, in this exemplary embodiment, the other processes include a facsimile transmitting process based on a transmission document 61 and a setting process which can make or change various settings of the facsimile apparatus 1. Upon completing the other processes (S5), the CPU 11 returns to operation S1.

In the setting process which is part of the other processes (S5), a mode validity setting of a wireless tag saving mode can be made. The wireless tag saving mode is a mode which relates to a manner of handling of reception data transmitted from a transmission source apparatus 60 and serves to prevent a waste of recording sheets 71 to which wireless tags 72 are attached. The wireless tag saving mode includes two detailed modes, that is, a transmission source check mode and a memory storage mode.

The transmission source check mode is a mode for comparing the party-to-communicate-with identification data of a transmission source apparatus 60 with the party-to-communicate-with identification data stored in the telephone directory storage area 142 and determining whether to receive wireless tag data from the party to communicate with. More specifically, whether to receive wireless tag data from the party to communicate with is determined on the basis of the contents (e.g., a reception permission or a reception prohibition) of wireless tag data reception settings which can be set for the respective pieces of party-to-communicate-with identification data.

The memory storage mode is a mode for storing reception data in the reception data storage area 143. If the memory storage mode is set, even if facsimile data 63 including wireless tag data is received, the CPU 11 stores the facsimile data 63 in the reception data storage area 143 without writing the wireless tag data to wireless tags 72. The reception data display process (S4) allows the user to check, later, the contents of the facsimile data 63 stored in the reception data storage area 143.

Therefore, if the setting process is started as one of the other processes (S5), a setting menu picture (see FIG. 7A) is displayed on the LCD 18. It is possible to choose between settings "valid" and "invalid" (i.e., "on" and "off") of the wireless tag saving mode and between the transmission source check mode and the memory storage mode (see FIG. 7B) by operating the operating panel 17 according to the display on the LCD 18.

In the other processes (S5), it is also possible to register data in the telephone directory data storage area 142 or update contents of the telephone directory data storage area 142. For example, it is possible to make or change wireless tag data reception settings of party-to-communicate-with identification data. That is, the it is possible to set a reception permission or a reception prohibition for each party-to-communicate-with identification data.

A facsimile receiving process program of the facsimile apparatus 1 according to an exemplary embodiment will be described in detail with reference to FIG. 8 which shows a flowchart of the facsimile receiving process program.

At operation S2 (see FIG. 6), the CPU 11 executes a facsimile receiving pre-process (S11). The facsimile receiving pre-process (S11) is a process for signal exchange that involves processing relating to the contents of an NSF signal.

The NSF signal is a signal indicating functions the facsimile apparatus 1 has (e.g., whether the facsimile apparatus 1 has a wireless tag recording ability or whether the facsimile apparatus 1 has an error correction mode (ECM) function).

Figure 9:
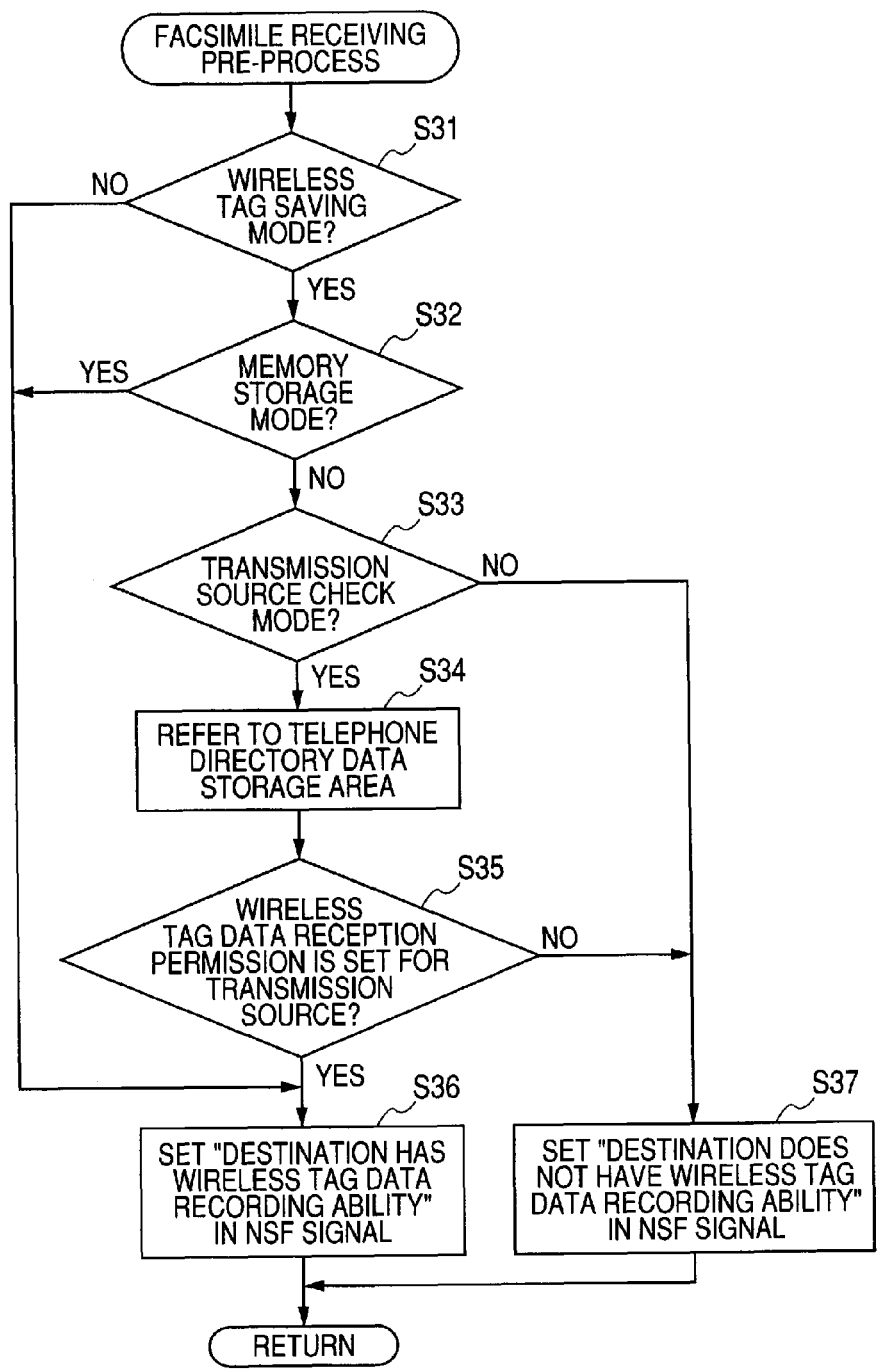
FIG. 9 is a flowchart of a facsimile receiving pre-process program according to an exemplary embodiment of the present invention.

The facsimile receiving pre-process (S11) will be described later in detail with reference to FIG. 9.

Upon completing the facsimile receiving pre-process (S11), at operation S12, the CPU 11 transmits an NSF signal to a transmission source apparatus 60 according to the contents that were set in the facsimile receiving pre-process (S11) in response to a request for an NSF signal that is transmitted from the transmission source apparatus 60.

The CPU 11 then stands by until an NSS signal is received from the transmission source apparatus 60. The NSS signal is a facsimile control signal that is transmitted from a transmission-side apparatus to a reception-side apparatus and is a signal for notifying the reception-side apparatus of settings relating to non-standard functions the transmission-side apparatus has. The NSS signal used in this exemplary embodiment includes size information 64 indicating the size of wireless tag data included in facsimile data 63.

Upon receiving an NSS signal from the transmission source apparatus 60, at operation S13 the CPU 11 acquires the size information 64 included in the NSS signal and stores the size information 64 in the size information storage area 135 (see FIG. 2).

At operation S14, the CPU 11 determines, on the basis of the received size information 64, whether facsimile data 63 to be transmitted from the transmission source apparatus 60 includes wireless tag data. That is, the CPU 11 determines whether the size information 64 is "0." If it is determined that the size information 64 is not "0" (S14: yes), the CPU 11 performs a wireless tag data receiving process (S15) and receives the wireless tag data. On the other hand, if it is determined that the size information 64 is "0" (S14: no), the CPU 11 performs an image data receiving process (S17) and receives image data of the facsimile data 63.

In the wireless tag data receiving process (S15), the CPU 11 receives reception data as wireless tag data and stores the wireless tag data in the reception facsimile data storage area 134. The CPU 11 then determines if data of the prescribed size has been received at operation S16. If it is determined that facsimile data 63 of the prescribed size indicated by the size information has been received (S16: yes), (i.e., if the reception of the wireless tag data has completed), the CPU 11 continues with operation S17.

At operation S17, the CPU 11 executes an image data receiving process. In the image data receiving process (S17), the CPU 11 stores image data in the reception facsimile data storage area 134 while receiving it as reception data. At operation S18, the CPU 11 determines whether all the image data of one page has been received. If it is determined that all the image data of one page has been received (S18: yes), processing proceeds to operation S19.

In this exemplary embodiment, wireless tag data and image data are discriminated from each other on the basis of size information while reception data is received. However, the present invention is not limited to such a case. It is alternatively possible to discriminate wireless tag data and image data from each other on the basis of size information after all reception data has been received.

At operation S19, the CPU 11 determines whether facsimile data 63 of all pages have been received. If it is determined that facsimile data 63 of all pages have been received (S19: yes), the CPU 11 finishes the reception of reception data and processing proceeds with operation S20. On the other hand, if it is determined that facsimile data 63 of all pages have not been received yet (S19: no), the CPU 11 returns to operation S14 and receives facsimile data 63 of the next page.

At operation S20, the CPU 11 checks the settings of the facsimile apparatus 1 and determines whether the memory storage mode is set valid. That is, the CPU 11 determines whether both of the wireless tag saving mode and the memory storage mode are valid. If it is determined that the memory storage mode is set valid (S20: yes), the CPU 11 performs a memory storage process (S25). On the other hand, if it is determined that the memory storage mode is invalid (S20: no), the CPU 11 continues to operation S21.

At operation S21, the CPU 11 refers to the reception facsimile data storage area 134 and determines whether wireless tag data was received. If it is determined that wireless tag data was received (S21: yes), the CPU 11 performs a wireless tag writing process (S22). On the other hand, if it is determined that wireless tag data was not received (S21: no), the CPU 11 performs an image data recording process (S23).

In the wireless tag writing process (S22), the CPU 11 writes wireless tag data stored in the reception facsimile data storage area 134 to a wireless tag 72 that is attached to a recording sheet 71. After writing the wireless tag data to the wireless tag 72, the CPU 11 continues with operation S23. The wireless tag writing process (S22) is executed for each page of the transmission document 61.

At operation S23, the CPU 11 records image data stored in the reception facsimile data storage area 134 on the recording sheet 71 with the laser printer 30. After forming an image on the recording sheets 71 on the basis of the image data, the CPU 11 continues with operation S24. The image data recording process (S23) is also executed for each page the transmission document 61.

Therefore, the wireless tag data which is part of facsimile data 63 of one page is written to the wireless tag 72 which is attached to the one recording sheet 71 and the image data portion is recorded on the same recording sheet 71.

At operation S23, if it is determined that the wireless tag saving mode is valid, the image data may be recorded on a recording sheet to which no wireless tag is attached.

After the image data of one page has been recorded on the recording sheet 71, the CPU continues with operation S24, where the CPU 11 determines whether recording of the reception data of all pages has completed. If it is determined that recording of the reception data of all pages has completed (S24: yes), the CPU 11 finishes the execution of the facsimile receiving process program. On the other hand, if it is determined that recording of the reception data of all pages has not completed yet (S24: no), the CPU 11 returns to operation S21 and starts recording of reception data of the next page.

On the other hand, if it is determined at operation S20 that the memory storage mode is set valid (S29: yes), the CPU 11 performs a memory storage process in which the CPU 11 stores, in the reception data storage area 143, the reception data (i.e., the facsimile data including the wireless tag data and the image data) stored temporarily in the reception facsimile data storage area 134. The memory storage process (S25) is executed on the reception data of all pages and hence the reception data of all pages are stored in the reception data storage area 143. After the reception data has been stored in the reception data storage area 143, the CPU 11 finishes the execution of the facsimile receiving process program.

A facsimile receiving pre-process program which is run at operation S11 of the facsimile receiving process will now be described in detail with reference to FIG. 9 which is a flowchart showing the facsimile receiving pre-process program.

Figure 7A:
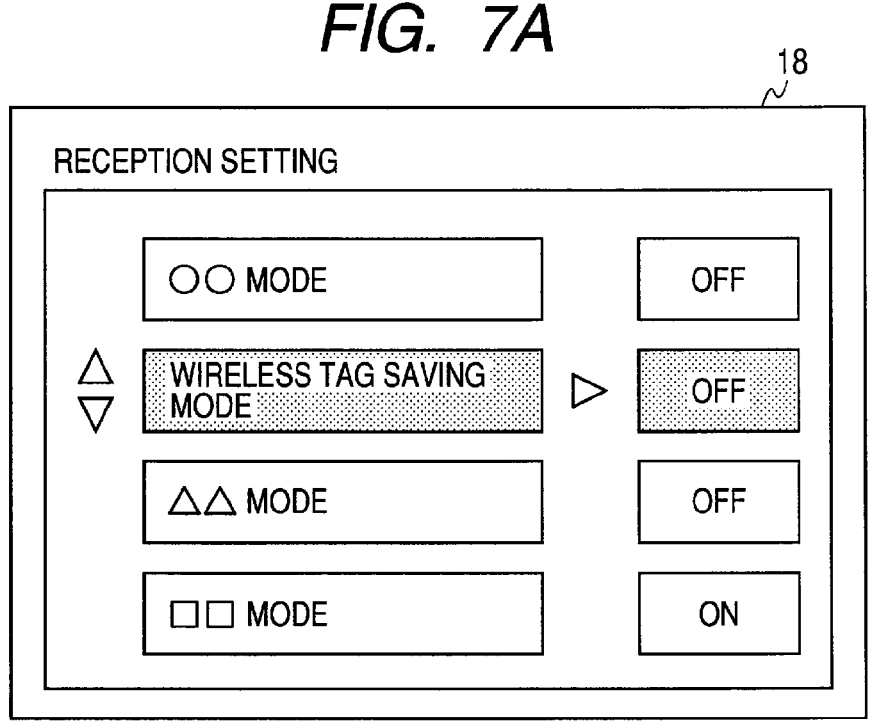
FIGS. 7A and 7B illustrate how a setting menu is displayed on an LCD.

At operation S11, the CPU 11 refers to the setting (i.e., the reception setting made as shown in FIG. 7A) of the facsimile apparatus 1 and determines whether the wireless tag saving mode is valid at operation S31. If it is determined that the wireless tag saving mode is valid (S31: yes), the CPU 11 proceeds with operation S32. On the other hand, if it is determined that the wireless tag saving mode is set invalid (S31: no), the CPU 11 proceeds with operation S36.

Figure 7B:
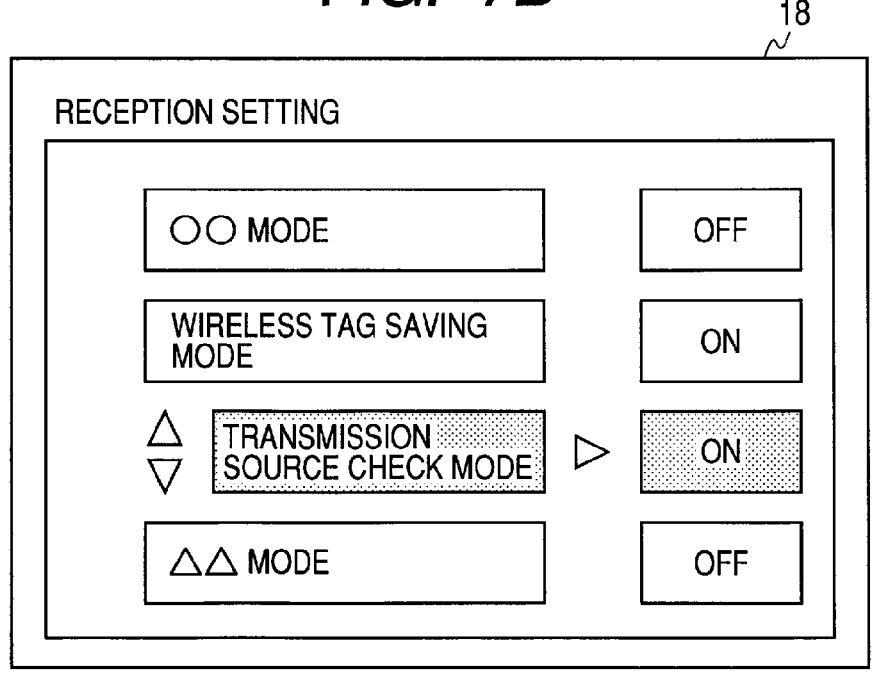

At operation S32, the CPU 11 determines, on the basis of the reception setting made as shown in FIG. 7B, whether the memory storage mode is valid. If it is determined that the memory storage mode is valid (S32: yes), the CPU 11 continues with operation S36. On the other hand, if it is determined that the memory storage mode is set invalid (S32: no), the CPU 11 proceeds to operation S33.

At operation S33, the CPU 11 determines whether the transmission source check mode is valid in the facsimile apparatus 1. If it is determined that the transmission source check mode is valid (S33: yes), the CPU 11 proceeds to operation S34. On the other hand, if the transmission source check mode is set invalid (S33: no), the CPU continues with operation S37.

At operation S34, since the transmission source check mode is set valid (S33: yes), the CPU 11 refers to the telephone directory data storage area 142 and checks whether the party-to-communicate-with identification data corresponding to the transmission source apparatus 60 exists at operation S35. More specifically, the CPU 11 refers to the wireless tag data reception setting of the party-to-communicate-with identification data corresponding to the transmission source apparatus 60 and determines if the wireless tag data reception setting exists.

The party-to-communicate-with identification data of the transmission source apparatus 60 is communicated from the transmission source apparatus 60 at the time of call termination before facsimile reception is started. The communicated party-to-communicate-with identification data is temporarily stored in a prescribed area of the RAM 13.

At operation S35, the CPU 11 determines whether the wireless tag data reception setting of the party-to-communicate-with identification data corresponding to the transmission source apparatus 60 is set to "reception permission." If it is determined that the wireless tag data reception setting is "reception permission" (S35: yes), the CPU 11 proceeds with operation S36. On the other hand, if the wireless tag data reception setting is "reception prohibition" (S35: no), the CPU 11 proceeds to operation S37.

Whether "reception permission" or "reception prohibition" should be set when no data corresponding to the communicated party-to-communicate-with identification data exists in the telephone directory data storage area 142 is set in advance. Upon occurrence of such a case, processing is performed according to that setting.

Figure 8:
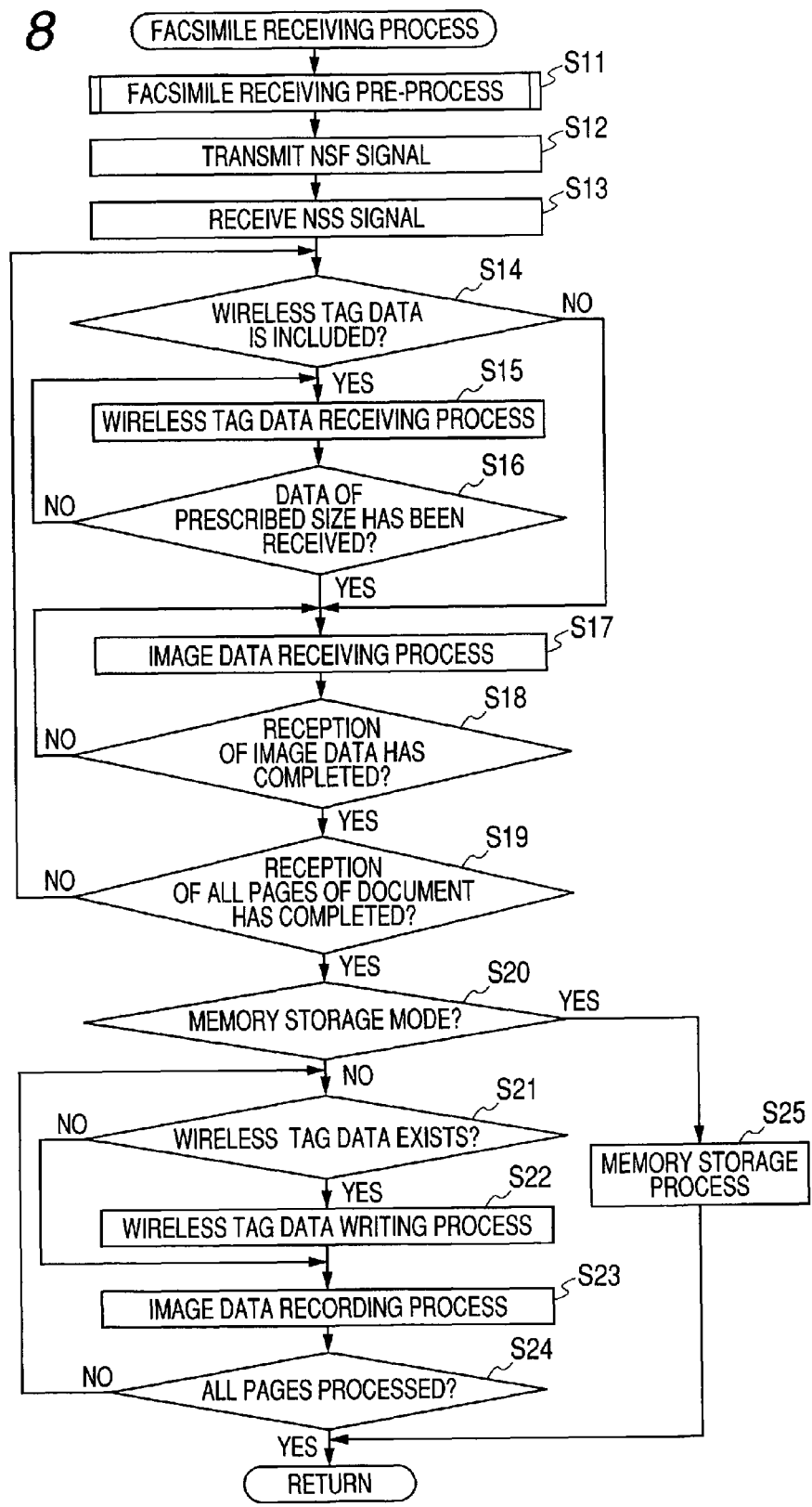
FIG. 8 is a flowchart of a facsimile receiving process program according to an exemplary embodiment of the present invention.

At operation S36, the CPU 11 sets information to the effect that the facsimile apparatus 1 has a wireless tag recording ability as the contents of an NSF signal to be transmitted to the transmission source apparatus 60 at operation S12 (see facsimile receiving process at FIG. 8). After setting the information to the effect that the facsimile apparatus 1 has a wireless tag recording ability as the content of an NSF signal at operation S36, the CPU 11 finishes the execution of the facsimile receiving pre-process program. As a result, at operation S12, the information to the effect that the facsimile apparatus 1 as the facsimile transmission destination has a wireless tag recording ability is communicated to the transmission source apparatus 60.

As a result, the transmission source apparatus 60 determines that even if facsimile data 63 comprising wireless tag data and image data is transmitted, no trouble will occur in the facsimile apparatus 1 in dealing with the wireless tag data and hence information relating to the facsimile data 63 can be transmitted properly. Therefore, in this case, the transmission source apparatus 60 transmits facsimile data 63 with an assumption that the facsimile apparatus 1 as the transmission destination has a wireless tag recording ability. That is, in this case, the facsimile data 63 to be received by the facsimile apparatus 1 is data comprising wireless tag data and image data or data including only image data.

On the other hand, at operation S37, the CPU 11 sets information to the effect that the facsimile apparatus 1 does not have a wireless tag recording ability as the contents of an NSF signal to be transmitted to the transmission source apparatus 60 at operation S12. After setting the information to the effect that the facsimile apparatus 1 does not have a wireless tag recording ability as the contents of an NSF signal, the CPU 11 finishes the execution of the facsimile receiving pre-process program. As a result, at operation S12, the information to the effect that the facsimile apparatus 1 as the facsimile transmission destination does not have a wireless tag recording ability is communicated to the transmission source apparatus 60.

As a result, the transmission source apparatus 60 recognizes that if facsimile data 63 consisting of wireless tag data and image data is transmitted, trouble will occur in the facsimile apparatus 1 in dealing with the wireless tag data. The transmission source apparatus 60 thus determines that it cannot transmit information relating to facsimile data 63 including wireless tag data. Therefore, in this case, the transmission source apparatus 60 transmits facsimile data 63 with an assumption that the facsimile apparatus 1 as the transmission destination does not have a wireless tag recording ability. That is, in this case, the facsimile data 63 to be received by the facsimile apparatus 1 is data including only image data.

If the information to the effect that the facsimile apparatus 1 does not have a wireless tag recording ability is set as the contents of an NSF signal (S37), facsimile data 63 not including wireless tag data is transmitted to the facsimile apparatus 1. As a result, in the facsimile apparatus 1, wireless tag data is not received as part of reception data and is not written to wireless tags 72. Therefore, in the facsimile apparatus 1, the consumption of wireless tags 72 which are expensive recording media can be reduced.

A reception data display process program of the facsimile apparatus 1 according to an exemplary embodiment of the present invention will now be described in detail with reference to FIG. 10 which is a flowchart of the reception data display process program.

At operation S4 (see FIG. 6), the CPU 11 refers to the reception data storage area 143 at operation S51 and determines, at operation S52, whether reception data (i.e., facsimile data 63) exists that has been stored at operation S25. If it is determined that reception data exists in the reception data storage area 143 (S52: yes), the CPU 11 continues with operation S53. On the other hand, if it is determined that no reception data exists in the reception data storage area 143 (S52: no), the CPU 11 finishes the execution of the reception data display process program at this stage. Information to the effect that no reception data exists may be displayed at this time.

Figure 11A:
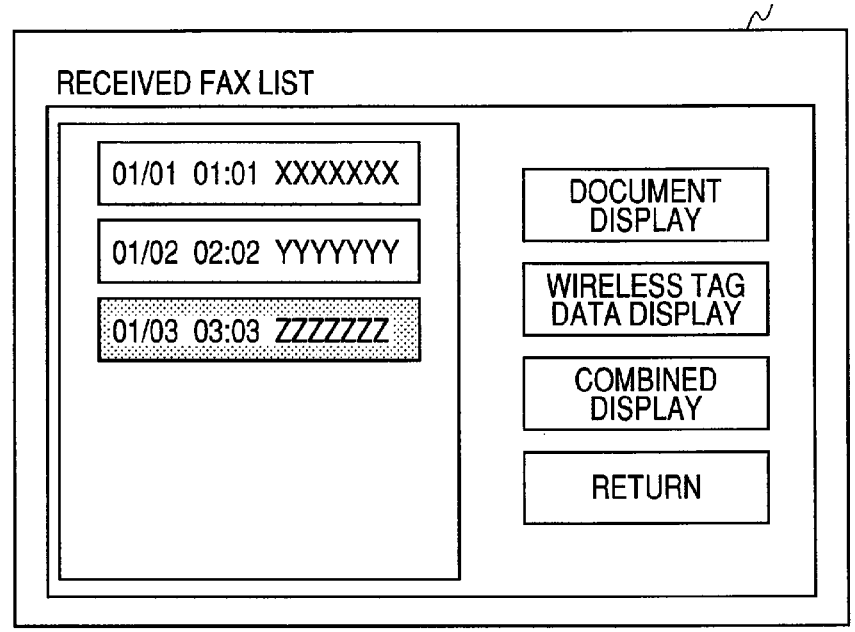
FIGS. 11A and 11B illustrate how a list of reception data is displayed on the LCD.
Figure 11B:
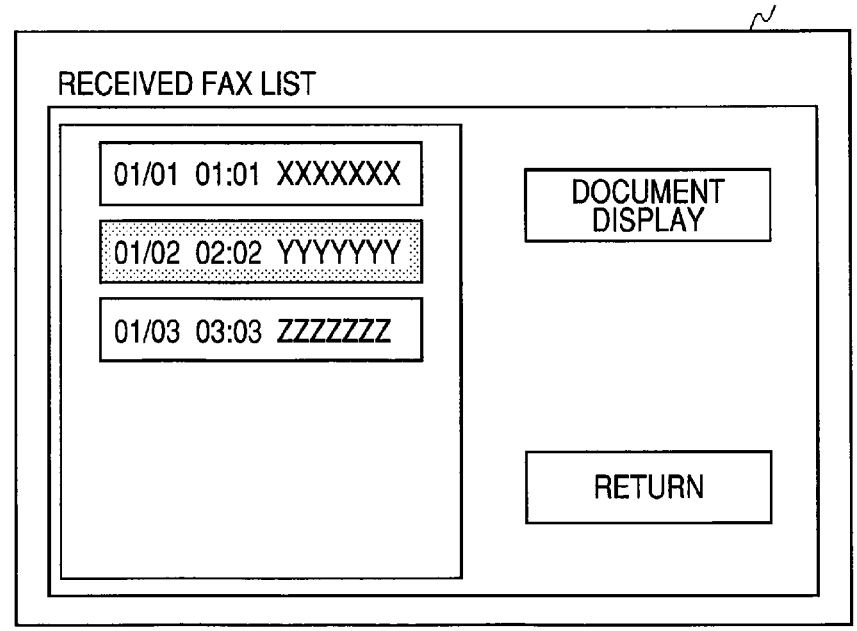

At operation S53, the CPU 11 displays, on the LCD 18, a list of reception data stored in the reception data storage area 143 (see, e.g., FIGS. 11A and 11B). That is, the CPU 11 refers to the individual reception data stored in the reception data storage area 143 and displays a list of the individual reception data on the LCD 18 in such a manner that the individual reception data can be discriminated from each other (e.g., a name, a telephone number, a reception date and time, etc. which are based on party-to-communicate-with identification data are displayed).

At operation S54, the CPU 11 executes a data selection accepting process. In the data selection accepting process (S54), the CPU 11 accepts selection of reception data to be displayed on the LCD 18 from the reception data stored in the reception data storage area 143. The CPU 11 executes the data selection accepting process according to an operation on the operating panel 17.

In the data selection accepting process (S54), a plurality of options are displayed in a data list display picture (see, e.g., FIGS. 11A and 11B). The options include options indicating the display modes of at least one of "document display," "wireless tag data display," and "combined display".

If the reception data that has been selected by an operation on the operating panel 17 includes image data and wireless tag data, three options "document display," "wireless tag data display," and "combined display" are displayed in the data list display picture (see FIG. 11A). On the other hand, if the selected reception data includes only image data, since no wireless tag data exists and hence neither wireless tag data display nor combined display can be performed, only the option "document display" is displayed in the data list display picture (see FIG. 11B).

In this manner, the display options (i.e., "document display," "wireless tag data display," and "combined display") are changed as appropriate according to the contents of reception data that is selected from the data list display picture.

At operation S55, the CPU 11 determines whether reception data to be displayed on the LCD 18 (hereinafter referred to as "display subject data") has been selected and the selection has been confirmed. The CPU 11 makes the determination on the basis of an operation signal from the operating panel 17. If it is determined that the selection of display subject data has been confirmed (S55: yes), the CPU 11 continues with operation S56. On the other hand, if it is determined that the selection of display subject data has not been confirmed (S55: no), the CPU 11 returns to operation S54. This allows another reception data stored in the reception data storage area 143 to be selected.

At operation S56, the CPU 11 determines whether the reception data that has been selected as display subject data includes wireless tag data. More specifically, the CPU 11 makes the determination by referring to the contents of the display subject data (reception data) stored in the reception data storage area 143. If it is determined that the display subject data includes wireless tag data (S56: yes), the CPU 11 proceeds with operation S57. On the other hand, if it is determined that the display subject data does not include wireless tag data (S56: no), the CPU 11 performs a document display process (S61).

At operation S57, the CPU 11 determines whether the option "combined display" has been selected by an operation on the operating panel 17. If it is determined that the option "combined display" has been selected (S57: yes), the CPU 11 performs a combined display process (S58). On the other hand, if it is determined that the option "combined display" has not been selected (S57: no), the CPU 11 continues with operation S59.

Figure 12A:
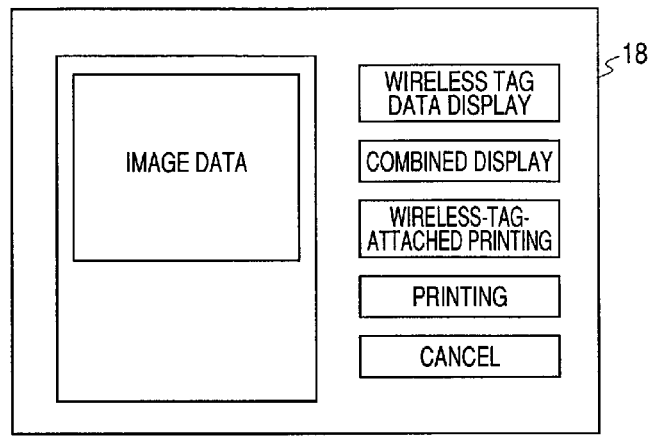
FIGS. 12A to 12C illustrate how reception data is displayed on the LCD.
Figure 12B:
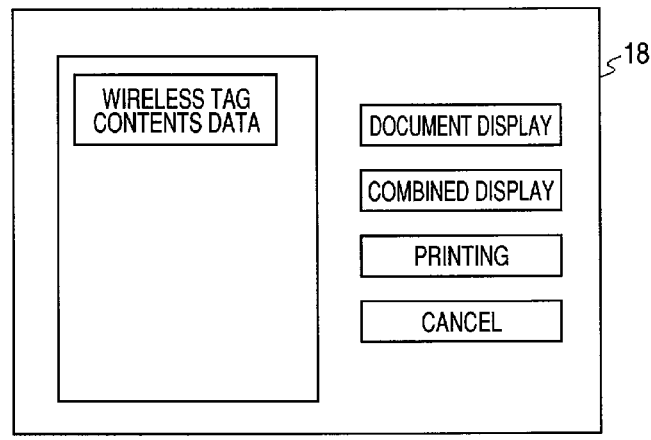
Figure 12C:
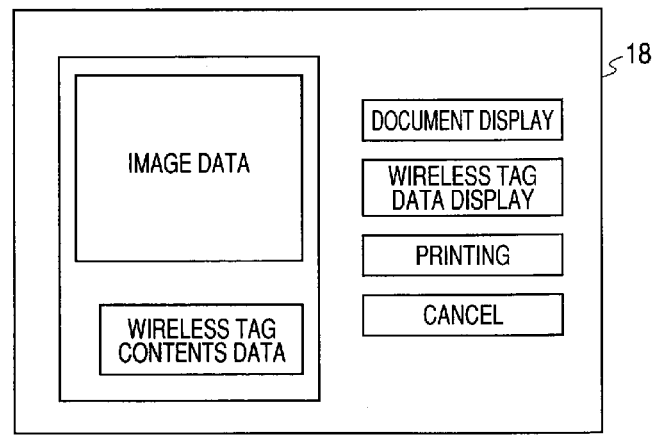

At operation S58, the CPU 11 generates combined image data on the basis of the image data and the wireless tag data which constitute the display subject data and displays the combined image data on the LCD 18 (see FIG. 12C). That is, in the combined display process (S58), the CPU 11 generates wireless tag contents image data representing the contents of the wireless tag data on the basis of the wireless tag data of the display subject data and generates combined image data on the basis of the generated wireless tag contents image data and the image data of the display subject data.

In generating combined image data, the CPU 11 combines the image data and the wireless tag contents image data so that the images of the image data and the wireless tag contents image data will be arranged at positions (see FIG. 12C). The positions may be predetermined. The processing for combining the image data and the wireless tag contents image data is known and hence will not be described in detail. Then, the CPU 11 displays the combined image data on the LCD 18.

The display position of the wireless tag contents image data relative to the image data is not limited to the that shown in FIG. 12C and may be various positions. In this respect, it is advantageous to display the wireless tag contents image data in a margin of the image data such as above or below the image data.

Upon completing the combined display process (S58), the CPU 11 finishes the execution of the reception data display process program and returns to the main control program.

While the combined image data is being displayed in the combined display process (S58), an option "printing" is displayed on the LCD 18 (see FIG. 12C). If the option "printing" is selected by an operation on the operating panel 17, the CPU 11 records the generated combined image data on recording sheets 71 with the laser printer 30. Recording sheets on which to record the combined image data need not always be sheets to which wireless tags 72 are attached. That is, a print result in which the contents of the wireless tag data are reflected can be obtained without using wireless tags 72.

At operation S59, the CPU 11 determines whether the option "wireless tag data display" has been selected by an operation on the operating panel 17. If it is determined that the option "wireless tag data display" has been selected (S59: yes), the CPU 11 performs a wireless tag data display process (S60). On the other hand, if it is determined that the option "wireless tag data display" has not been selected (S59: no), that is, if the option "document display" has been selected, the CPU 11 performs a document display process (S61).

If it is determined that the option "wireless tag data display" has been selected and the CPU 11 performs the wireless tag data display process (S60), the CPU 11 generates a wireless tag contents image data representing the contents of the wireless tag data on the basis of the wireless tag data which is part of the display subject data and displays the wireless tag contents image data on the LCD 18 (see FIG. 12B). The processing for generating wireless tag contents image data is known and hence will not be described in detail.

Upon completing the wireless tag data display process (S60), the CPU 11 finishes the execution of the reception data display process program and returns to the main control program.

Also in the wireless tag data display process (S60), an option "printing" is displayed on the LCD 18 while the wireless tag contents image data is being displayed. If the option "printing" is selected by an operation on the operating panel 17, the CPU 11 records the generated wireless tag contents image data on recording sheets 71 with the laser printer 30. Recording sheets on which to record the wireless tag contents image data need not always be sheets to which wireless tags 72 are attached.

At operation S61, the CPU 11 displays the image data of the display subject data on the LCD 18 (see FIG. 12A). Upon completing the document display process (S61), the CPU 11 finishes the execution of the reception data display process program and returns to the main control program.

As shown in FIG. 12A, an option "printing" is displayed on the LCD 18 in the document display process (S61) as in the combined display process (S58) and the wireless tag data display process (S60). If the option "printing" is selected by an operation on the operating panel 17, the CPU 11 records the image data of the display subject data on recording sheets 71 with the laser printer 30. Recording sheets on which to record the image data need not always be sheets to which wireless tags 72 are attached.

In the document display process (S61), an option "wireless-tag-attached printing" is displayed on the LCD 18. If the option "wireless-tag-attached printing" is selected by an operation on the operating panel 17, the CPU 11 records the image data of the display subject data on recording sheets 71 with the laser printer 30. In addition to the recording of the image data on the recording sheets 71, the CPU 11 writes the wireless tag data of the display subject data to the wireless tags 72 attached to the recording sheets 71 with the wireless tag writer 16.

As described above, in the facsimile apparatus 1 according to an exemplary embodiment of the present invention, the wireless tag saving mode can be set valid or invalid. In the facsimile apparatus 1, if the wireless tag saving mode is set valid, wireless tag data of reception data is not written to wireless tags except for a prescribed case (i.e., the transmission source check mode is valid and reception permission is set). That is, in the facsimile apparatus 1, wireless tag data is not written to wireless tags unnecessarily, whereby a waste of wireless tags which are relatively expensive recording media can be prevented.

Moreover, in the facsimile apparatus 1, the contents of wireless tag data can be displayed on the LCD 18 (S58 and S60) in the reception data display process (S4). This allows a reception-side user to decide whether to write the wireless tag data to wireless tags after recognizing and examining the contents of the wireless tag data, which in turn allows the user to deal with the reception data properly.

Additionally, in the facsimile apparatus 1, when reception data including wireless tag data and image data is received, selection can be made as appropriate from display of the image data (S61), display of wireless tag contents image data (S60), and display of combined image data (S58) in the reception data display process (S4) and relevant information can be displayed on the LCD 18 in the selected form. As a result, a reception-side user can check the contents of the display subject data using the display on the LCD 18, and hence the display subject data (i.e., reception data) can be handled properly.

In particular, when combined image data is displayed on the LCD 18, a user can determine the contents of the wireless tag data visually because the image data of the reception data and the contents of the wireless tag data are displayed. Furthermore, a user can clearly recognize a corresponding relationship between the image data and the wireless tag data. As such, the facsimile apparatus 1 can provide an opportunity to comprehensively determine whether to output the image data and whether to output the wireless tag data.

Moreover, in the facsimile apparatus 1, in the reception data display process (S4), display subject data can be recorded in various forms such as a form that only image data of the display subject data is recorded on recording sheets 71 (S61), a form that combined image data is recorded on recording sheets 71 (S58), a form that image data of the display subject data is recorded on recording sheets 71 and wireless tag data is written to wireless tags 72 (S61), and a form that wireless tag contents image data is recorded on recording sheets 71 (S60). The facsimile apparatus 1 thus provides an opportunity to check the contents of the wireless tag data and can flexibly accommodate different data output forms.

Additionally, in the facsimile apparatus 1, the transmission source check mode can be set valid or invalid. If the transmission source check mode is valid, the facsimile apparatus 1 transmits an NSF signal including information to the effect that it does not have a wireless tag data recording ability to a transmission source apparatus 60 even if it has the wireless tag writer 16. As a result, the transmission source apparatus 60 performs a facsimile transmission to the facsimile apparatus 1 with an assumption that the latter does not have a wireless tag data recording ability. Since no wireless tag data is transmitted from the transmission source apparatus 60 to the facsimile apparatus 1, the facsimile apparatus 1 need not write wireless tag data to wireless tags. As a result, in the facsimile apparatus 1, a waste of wireless tags which are relatively expensive recording media can be prevented.

If the transmission source check mode is valid, the facsimile apparatus 1 can set "reception permission" or "reception prohibition" for each party-to-communicate identification data stored in the telephone directory data storage area 142 and determines the contents of an NSF signal to be transmitted to a transmission source apparatus 60 on the basis of the contents of the telephone directory data storage area 142 and party-to-communicate identification data of the transmission source apparatus 60 that is recognized at the time of reception. This allows flexibility in setting wireless tag data reception forms that are suitable for respective transmission sources.

The facsimile apparatus 1 can set the memory storage mode valid or invalid. If the memory storage mode is valid, reception data is stored in the reception data storage area 143. This allows a later determination of how to handle wireless tag data. That is, more time is allowed to consider whether to output the wireless tag data.

In the reception data display process (S4), the reception data stored in the reception data storage area 143 can be merely displayed on the LCD 18, recorded on recording sheets 71, or written to wireless tags 72. That is, the reception data can be output according to a desired output form.

Furthermore, in the facsimile apparatus 1, since the wireless tag saving mode can be set valid or invalid and selection can be made between the transmission source check mode and the memory storage mode, the form of handling of wireless tag data can be set to a desired form. This allows the facsimile apparatus 1 to flexibly accommodate a use form of a reception-side user, whereby the convenience of the reception-side user can be increased.

Although the present invention has been described with reference to exemplary embodiments thereof, the invention is not limited to the exemplary embodiments described above and various improvements and modifications can be made without departing from the spirit and scope of the invention.

For example, it is possible to add display appropriateness setting data indicating an appropriateness of display on the LCD 18 to each data of wireless tag data and to determine the contents of each wireless tag contents image data on the basis of the corresponding display appropriateness setting data.

Wireless tag data may include data that are suitable for display and data that are not. Therefore, to prevent display of the data that are not suitable for display, it is advantageous to determine the contents of wireless tag contents image data so that each data is displayed or not displayed in the combined display form or the wireless tag data display form according to the corresponding display appropriateness setting data.

That is, wireless tag contents image data is formed only by data that are part of the wireless tag data and for which "to be displayed" is set in the display appropriateness setting data. Therefore, the contents of wireless tag data consisting of only the data for which "to be displayed" is set in the display appropriateness setting data are displayed on the LCD 18.

In other words, the data to which display appropriateness setting data "not to be displayed" is added are not displayed on the LCD 18 nor recorded on recording sheets 71 as part of the contents of wireless tag data. Therefore, for the data of "not to be displayed," neither of options "wireless tag data display" and "combined display" (see FIGS. 12A to 12C) is displayed.

Display appropriateness setting data may be set in the wireless tags of a transmission document 61 in a transmission source apparatus 60. Alternatively, display appropriateness setting may be made for each of kinds of data comprising wireless tag data in the facsimile apparatus 1 as the reception side of a facsimile transmission.

The transmission source check mode, which may be selected when the wireless tag saving mode is selected, may be omitted. That is, when the wireless tag saving mode is selected, "wireless tag recording ability: none" may be set in an NSF signal for every transmission source.

Although the above exemplary embodiments are directed to a facsimile apparatus, the present inventive concept is also applicable to an information processing apparatus such as a personal computer which receives data from another terminal or a printer which receives data from a scanner or a personal computer.

In the above exemplary embodiments, the wireless tag is used as an example of the first storage unit. However, a portable storage device such as a USB memory or a medium card or a large-size recording device may be used.

In the communication apparatus according to exemplary embodiments of the present invention, image data and related data can be received by the image data receiving means and the related data receiving means, respectively. In the communication apparatus, the related data can be written to the storing means by the data writing means and the write prohibition setting can be set valid or invalid by the setting means. With this configuration, in the communication apparatus, related data is not written to the storing means unnecessarily and a waste of storing means can be prevented. The storing means is a wireless tag, and a waste of wireless tags which are relatively expensive storing means can be prevented.

In the communication apparatus according to exemplary embodiments of the present invention, if the write prohibition setting is made effective and the first detailed setting is made by the setting means, the contents of related data can be displayed on the display unit when the related data is received. The communication apparatus can thus allows a reception-side user to recognize the contents of the related data. Therefore, the reception-side user can determine whether to write the related data to the storing means after examining the contents and hence can take a proper determination.

In the communication apparatus according to exemplary embodiments of the present invention, if the write prohibition setting is made effective and the second detailed setting is made by the setting means, when a check signal is received from a transmission source, a receiving function absence signal can be transmitted to the transmission source even if the related data receiving means exists. Therefore, the data transmission source recognizes that the communication apparatus does not have a related data receiving means and transmits data under that condition. That is, the transmission source does not transmit related data and hence the communication apparatus does not write data to the storing means.

Therefore, the storage capacity of the storing means can be prevented from being wasted. Where the storing means is a wireless tag, a waste of wireless tags can be prevented.

In the communication apparatus according to exemplary embodiments of the present invention, in making the write prohibition setting valid, the setting means can establish a desired detailed setting among a plurality of detailed settings including the first detailed setting and the second detailed setting. That is, the communication apparatus can set the form of handling of related data to a desired form. As a result, the communication apparatus can adapt to a use form of handling of related data and hence can increase the convenience.

In the communication apparatus according to exemplary embodiments of the present invention, if the write prohibition setting is made valid and the first detailed setting is established, when image data of a document and related data relating to the image data are received, the display controller displays, on the display unit, the image data and the contents of the related data. Therefore, a corresponding relationship between the image data and the related data may be recognized. In this manner, the communication apparatus can provide an opportunity to comprehensively determine whether to output the image data and whether to output the related data.

In the communication apparatus according exemplary embodiments of the present invention, the combined image generating unit can generate combined image data in which content data of related data is arranged at a predetermined position relative to image data of a document. That is, in the communication apparatus, the related data is not written to the storing means and converted into the content data which is part of the combined image data. With this measure, the contents of the related data can be handled in the same manner as the image data; that is, the related data can be printed on ordinary recording sheets to enable a check of its contents as well as its management. As a result, the consumption of the capacity of the storing means can be reduced. Where the storing means is a wireless tag, the consumption of wireless tags can be reduced.

In the communication apparatus according to exemplary embodiments of the present invention, when combined image data is generated, the display controller displays the generated combined image data on the display unit. That is, in the communication apparatus, the combined image data being displayed on the display unit may be checked and hence it is easier to determine whether to output the combined image data.

In the communication apparatus according to exemplary embodiments of the present invention, the output mode selecting means makes it possible to select the output mode of data received from a transmission source from the first output mode, the second output mode, and the third output mode after image data and the contents of related data are displayed on the display unit by the display controller. With this measure, the communication apparatus gives an opportunity to check the contents of the related data and enables data output in a desired output form.

In the communication apparatus according to exemplary embodiments of the present invention, if the write prohibition setting is made effective and the second detailed setting is established, when a check signal is received from a transmission source, a receiving function absence signal is transmitted to the transmission source even if the related data receiving means exists. Therefore, the data transmission source transmits data under that condition under a condition that the data transmission destination does not have a related data receiving means. That is, the transmission source does not transmit related data and hence the communication apparatus does not write data to the storing means. Therefore, a waste of storing means can be prevented. Where the storing means is a wireless tag, a waste of wireless tags can be prevented.

In the communication apparatus according to exemplary embodiments of the present invention, in a state that the write prohibition setting is made valid and the second detailed setting is established, whether to transmit a receiving function absence signal can be determined on the basis of identification data of a transmission source acquired by the identification data acquiring means when data is received from the transmission source and response content changing data corresponding to the identification data of the transmission source stored in the identification data storing means. That is, in the communication apparatus, since whether to transmit a receiving function absence signal can be determined for each identification data, whether to receive related data can be determined for each transmission source. This allows flexibility in setting a related data reception form that is suitable for a transmission source.

In the communication apparatus according to exemplary embodiments of the present invention, if the setting state judging means determines that the write prohibition setting is made valid at the time of reception of related data, the control means can perform a control so that data received over a line is stored in the second storing means and storage contents of the stored data are held. With this measure, since the storage contents of received data are held by the second storing means, it is possible to determine how to handle related data and hence to sufficiently examine how to output the related data.

In the communication apparatus according to exemplary embodiments of the present invention, image data and related data can be received by the image data receiving means and the related data receiving means, respectively. In the communication apparatus, the related data can be written to the storing means by the data writing means. If the first detailed setting is established, when related data is received, in the communication apparatus the display controller can display the contents of the related data on the display unit. The communication apparatus can thus allows a reception-side to recognize the contents of the related data. Therefore, the reception-side can determine whether to write the related data to the storing means after examining its contents and hence can take a proper determination.

In the communication apparatus according to exemplary embodiments of the present invention, if the first detailed setting is established by the display setting means, when image data and related data relating to the image data are received, the image data is displayed on the display unit together with the contents of the received related data. Therefore, a corresponding relationship between the image data and the related data may be clearly recongized. In this manner, the communication apparatus can provide an opportunity to comprehensively determine whether to output the image data and whether to output the related data.

In the communication apparatus according exemplary embodiments of the present invention, if the first detailed setting is established by the display setting means, when image data of a document and related data relating to the image data are received, the combined image generating unit can generate combined image data in which content data of the related data is arranged at a predetermined position relative to the image data. That is, in the communication apparatus, the related data is not written to the storing means and converted into the content data which is part of the combined image data. With this measure, the contents of the related data can be handled in the same manner as the image data; that is, the related data can be printed on ordinary recording sheets to enable a check of its contents as well as its management. As a result, the consumption of the storage capacity of the storing means can be reduced. Where the storing means is a wireless tag, the consumption of wireless tags can be reduced.

In the communication apparatus according to exemplary embodiments of the present invention, when combined image data is generated, the display controller displays the generated combined image data on the display unit. That is, in the communication apparatus, the combined image data being displayed on the display unit may be checked and hence it can be more easily determined whether to output the combined image data.

In the communication apparatus according to exemplary embodiments of the present invention, the output mode selecting means makes it possible to select the output mode of data received from a transmission source from the first output mode, the second output mode, and the third output mode after image data and the contents of related data are displayed on the display unit by the display controller. With this measure, the communication apparatus gives an opportunity to check the contents of the related data and enables data output in a desired output form.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A communication apparatus comprising:
   an image data receiving unit which receives image data;
   a related data receiving unit which receives related data which relates to the image data;
   a data writing unit which writes the related data received by the related data receiving unit to a first storage unit; and
   a setting unit which is configured to set a write prohibition setting which prohibits writing of the related data to the first storage unit.

2. The communication apparatus according to claim 1, wherein the first storage unit comprises a wireless tag provided with a recording sheet on which the image data is to be recorded.

3. The communication apparatus according to claim 2, wherein the image data receiving unit receives the image data through a telephone line and the related data receiving unit receives the related data through the telephone line.

4. The communication apparatus according to claim 1, further comprising:
   a display unit; and
   a display controller which controls the display unit,
   wherein if the write prohibition setting is set valid, the setting unit enables setting of a first detailed setting in which the display controller controls the display unit to display a content of the related data if the related data receiving unit receives the related data.

5. The communication apparatus according to claim 4, further comprising a transmitting unit which transmits data to an external device with which data is to be communicated,
   wherein, if the write prohibition setting is set valid, the setting unit enables setting of a second detailed setting which controls the transmitting unit to transmit a receiving function absence signal to the external device, in response to a check signal, received from the external device, for checking whether the communication apparatus includes the related data receiving unit,
   wherein, when the second detailed setting is set, the transmitting unit is controlled to transmit the receiving function absence signal to the communication apparatus, even if the communication apparatus includes the related data receiving unit.

6. The communication apparatus according to claim 5, wherein the setting unit sets a desired detailed setting among a plurality of detailed settings which comprises the first detailed setting and the second detailed setting in connection with setting the write prohibition setting valid.

7. The communication apparatus according to claim 4, wherein in a case where the image data receiving unit receives the image data, the related data receiving unit receives the related data, the write prohibition setting is set valid, and the first detailed setting is set by the setting unit, the display controller controls the display unit to display the image data and a content of the related data.

8. The communication apparatus according to claim 7, further comprising a combined image generating unit which generates combined image data in which content data indicating the content of the related data is arranged at a predetermined position in the image data.

9. The communication apparatus according to claim 8, wherein if the combined image data is generated by the combined image generating unit, the display controller controls the display unit to display the generated combined image data.

10. The communication apparatus according to claim 7, further comprising an output mode selecting unit and a recording unit, the output mode selecting unit selecting among a first output mode in which only the image data is recorded by the recording unit, a second output mode in which combined image data obtained by combining the image data and a content of the related data is recorded by the recording unit, and a third output mode in which the image data is recorded by the recording unit and the related data is written to the first storage unit by the data writing unit, after the image data and the content of the related data are displayed on the display unit by the display controller.

11. The communication apparatus according to claim 1, further comprising a transmitting unit which transmits data to an external device with which data is to be communicated,
    wherein, if the write prohibition setting is set valid, the setting unit enables setting of a second detailed setting which controls the transmitting unit to transmit a receiving function absence signal to the external device, in response to a check signal, received from the external device, for checking whether the communication apparatus includes the related data receiving unit,
    wherein, when the second detailed setting is set, the transmitting unit is controlled to transmit the receiving function absence signal to the external device, even if the communication apparatus includes the related data receiving unit.

12. The communication apparatus according to claim 11, further comprising:
    an identification data acquiring unit which acquires identification data for identifying a transmission source of the image data when the image data receiving unit receives the image data;
    an identification data storage unit which stores the identification data;
    a response setting unit which sets response content data indicating whether the second detailed setting is set, for each of the identification data stored in the identification data storage unit; and a response content determining unit which, in a case where the write prohibition setting is set valid and the second detailed setting is set by the setting unit, determines whether to transmit the receiving function absence signal when receiving the image data, based on the identification data and the response content data corresponding to the identification data.

13. The communication apparatus according to claim 1, further comprising:
a setting state determining unit which determines whether the write prohibition setting is valid or invalid;
a second storage unit;
a controller which, in a case where the related data receiving unit receives the related data and the setting state determining unit determines that the write prohibition setting is set valid, controls the second storage unit to store and retain the image data and the related data.

14. A communication apparatus comprising:
an image data receiving unit which receives image data;
a related data receiving unit which receives related data which relates to the image data;
a data writing unit which writes the related data received by the related data receiving unit to a first storage unit;
a display unit;
a display controller which controls the display unit;
a display setting unit which sets a first detailed setting in which the display controller controls the display unit to display a content of the related data if the related data receiving unit receives the related data; and
a printing unit which prints the content of the related data on a recording sheet.

15. The communication apparatus according to claim 14, wherein the first storage unit comprises a wireless tag provided with a recording sheet on which the image data is to be recorded.

16. The communication apparatus according to claim 15, wherein the image data receiving unit receives the image data through a telephone line and the related data receiving unit receives the related data through the telephone line.

17. The communication apparatus according to claim 14, wherein in a case where the image data receiving unit receives the image data, the related data receiving unit receives the related data, and the first detailed setting is set by the display setting unit, the display controller controls the display unit to display the image data and the content of the related data.

18. The communication apparatus according to claim 17, further comprising a combined image generating unit which generates combined image data in which content data indicating the content of the related data is arranged at a predetermined position in the image data.

19. The communication apparatus according to claim 18, wherein, if the combined image data is generated by the combined image generating unit, the display controller controls the display unit to display the generated combined image data.

20. The communication apparatus according to claim 17, further comprising an output mode selecting unit and a recording unit, the output mode selecting unit selecting among one of a first output mode in which only the image data is recorded by the recording unit, a second output mode in which combined image data obtained by combining the image data and the content of the related data is recorded by the recording unit, and a third output mode in which the image data is recorded by the recording unit and the related data is written to the first storage unit by the data writing unit, after the image data and the content of the related data are displayed on the display unit by the display controller.

21. A communication apparatus comprising:
an image data receiving unit which receives image data;
a wireless tag data receiving unit which receives wireless tag data indicating information related to the image data, the information including identification information for identifying an external apparatus from which the image data is received by the image data receiving unit;
a data writing unit which is configured to write the wireless tag data to a wireless tag provided on a recording sheet; and
a setting unit which is configured to set a write prohibition flag which, if set, prohibits the data writing unit from writing the wireless tag data to the wireless tag provided on the recording sheet.

* * * * *